(No Model.)
J. H. BEAN.
COFFEE POT.
No. 264,025. Patented Sept. 5, 1882.
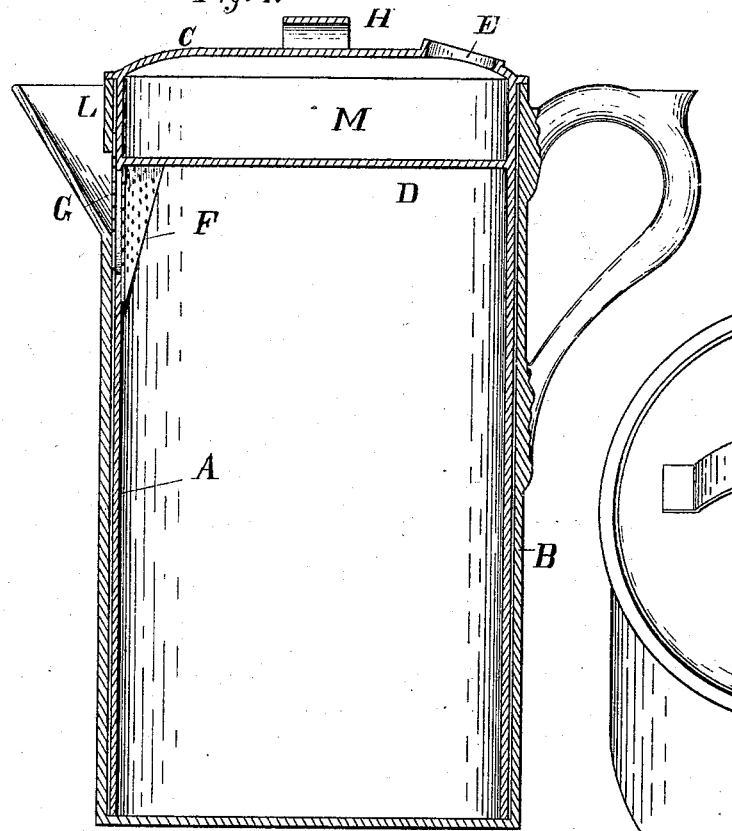
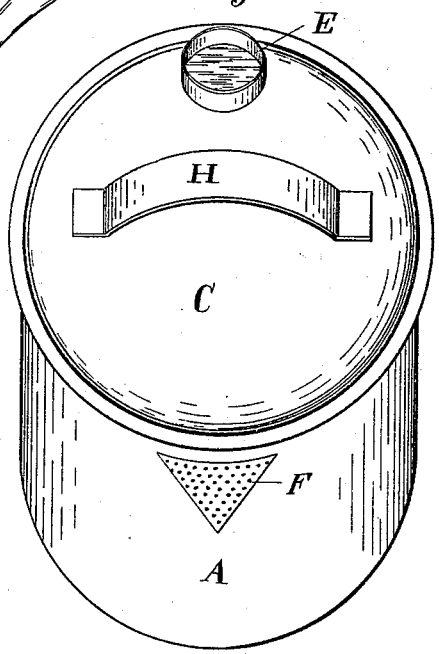
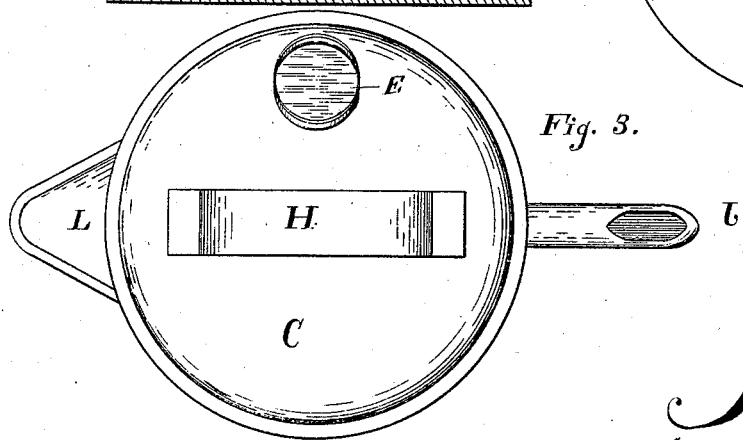
Attest:
J. Wm. Strebli.
G. D. Spielman
Inventor:
Joseph H. Bean

United States Patent Office.

JOSEPH H. BEAN, OF CINCINNATI, OHIO.

COFFEE-POT.

SPECIFICATION forming part of Letters Patent No. 264,025, dated September 5, 1882.

Application filed July 14, 1882. (No model.)

*To all whom it may concern:*

Be it known that I, JOSEPH H. BEAN, of Cincinnati, county of Hamilton and State of Ohio, have invented new and useful Improvements in Coffee-Pots, which improvements are fully set forth in the following specification, reference being had to the accompanying drawings.

The object of my invention is to so construct a coffee-pot that all the steam from the boiling coffee shall be condensed and remain in the pot without allowing the steam to come in contact with cold water direct, as is usually done. In this way I save the aroma of the coffee, which is not the case if the steam is allowed to escape from the pot, or is condensed by coming in contact with cold water. This is done by very simple means, which I will describe in detail.

Figure 1 is a sectional view of my invention, shown through the center of the spout and handle. Fig. 2 is a perspective, and Fig. 3 a top, view.

The pot consists of two cylinders, A and B, one placed inside of the other. The outer one, B, is simply a plain pot with only the handle and spout, with a portion of the opening from the pot to the spout covered with perforated sheet-tin or wire-gauze, as shown at G, Fig. 1. This cylinder is provided with a bottom in the usual way. The inner cylinder, A, is open at the bottom and is as long as the outer one, but may be shorter, if desired. This cylinder is provided with a cross-head placed about half-way between the top and the bottom of the spout L. This cross-head fills the cylinder A and is soldered tight all around. On top of A is permanently soldered the lid C. This lid has a handle, H, and an opening, E. This opening is close to the wall of the cylinder A and about an inch and a half in diameter. Directly opposite the opening E, and close under the cross-head D, a hole is cut through the wall of the cylinder A, and covered by soldering on a piece of perforated sheet-tin or wire-gauze, as shown at F. Between the lid C and the cross-head D is formed the cup M, which holds a pint, less or more, of water.

When coffee is to be made it is put in the cylinder B, as in the common coffee-pot, and the water poured on. Then the cylinder A is shoved down, with the opening E and perforated part F placed half-way between the handle and spout, as shown in the top view, Fig. 3. This brings the solid part of the cylinder A over the perforations G in the spout L, which prevents the escape of steam at this point. The cup M is now filled about half-full of cold water through the opening E. As the coffee boils the steam strikes the cross-head D, which is the bottom of the cup M, and is condensed and runs back into the coffee. If steam is formed by long boiling in the cup M and issues from the opening E, pour more cold water into the cup M. Keep the water in the cup M colder than the coffee and all the steam is condensed, and the rich aroma is saved in the coffee, and not wasted on the air or in the water of a condenser, as they are usually made.

When the coffee is served turn the cylinder A by means of the handle H, so that the opening E comes to the handle *b* and the perforations F opposite the perforations G in the spout L, as shown in Fig. 1. Now there is formed an outlet for the coffee, and a double strainer, which insures perfectly clear coffee, and places the opening E at the highest point of the lid, so no water will spill therefrom.

The advantages of my invention are simplicity, cleanliness, and the most perfect coffee that it is possible to make.

I claim as my invention—

The coffee-pot described, consisting of the cylinders A and B, cross-head D, lid C, opening E, cup M, perforated parts G and F, spout L, and handles H and *b*, substantially as and for the purpose set forth.

JOSEPH H. BEAN.

Attest:
 A. S. LUDLOW,
 J. WM. STREHLI.